(12) United States Patent
Castagna et al.

(10) Patent No.: US 6,970,397 B2
(45) Date of Patent: Nov. 29, 2005

(54) DETERMINATION OF FLUID PROPERTIES OF EARTH FORMATIONS USING STOCHASTIC INVERSION

(75) Inventors: John P. Castagna, Norman, OK (US); Luther W. White, Norman, OK (US); William J. Lamb, Norman, OK (US)

(73) Assignee: Gas Technology Institute, Des Plaines, IL (US)

( * ) Notice: Subject to any disclaimer, the term of this patent is extended or adjusted under 35 U.S.C. 154(b) by 234 days.

(21) Appl. No.: 10/616,557

(22) Filed: Jul. 9, 2003

(65) Prior Publication Data

US 2005/0007876 A1 Jan. 13, 2005

(51) Int. Cl.$^7$ ................................................ G01V 1/30
(52) U.S. Cl. ............................ 367/73; 367/38; 367/75; 702/11; 702/14
(58) Field of Search ............................ 367/38, 59, 60, 367/73, 75; 702/11, 12, 13, 14

(56) References Cited

U.S. PATENT DOCUMENTS

| | | | |
|---|---|---|---|
| 4,817,060 A | 3/1989 | Smith | 367/52 |
| 4,858,200 A | 8/1989 | Goins | 367/75 |
| 4,858,201 A | 8/1989 | Goins et al. | 367/75 |
| 4,995,007 A | 2/1991 | Corcoran et al. | 367/52 |
| 5,001,677 A | 3/1991 | Masters | 367/68 |
| 5,440,525 A | 8/1995 | Dey-Sarkar et al. | 367/52 |
| 5,583,825 A | 12/1996 | Carrazzone et al. | 367/31 |
| 6,302,221 B1 | 10/2001 | Hamman et al. | 175/50 |
| 6,691,036 B2 * | 2/2004 | Blanch et al. | 702/11 |
| 2002/0188406 A1 * | 12/2002 | Nivlet et al. | 702/14 |

OTHER PUBLICATIONS

Gary Mavko et al.; *A rock physics strategy for quantifying uncertainity in common hydrocarbon indicators*, Geophysics, vol. 63, No. 6, (Nov.–Dec. 1998), pp. 1997–2008, 13 Figs.

Amos Nur et al.; *Critical porosity: A key to relating physical properties to porosity in rocks*, The Leading Edge, Mar. 1998, pp. 357–362, 14 Figs.

Luther White et al.; *Stochastic fluid modulus inversion*, Geophysics, vol. 67, No. 6 (Nov.–Dec. 2002), pp. 1835–1843, 9 Figs., 3 Tables.

W. W. Symes et al.; *Velocity inversion by differential semblance optimization*, Geophysics, vol. 56, No. 5 (May 1991), pp. 654–663, 5 Figs.

W. J. Ostrander; *Plane–wave reflection coefficients for gas sands at nonnormal angles of incidence*, Geophysics, vol. 49, No. 10 (Oct. 1984), pp. 1673–1648, 20 Figs., 1 Table.

* cited by examiner

*Primary Examiner*—Ian J. Lobo
(74) *Attorney, Agent, or Firm*—Madan, Mossman & Sriram, P.C.

(57) ABSTRACT

A method of determining a fluid property in a subsurface region of interest of an earth formation uses measurements of seismic attributes on seismic data. For a test region, a plurality of realizations of rock properties are specified, and for each of the realizations and a selected value of a fluid property, the seismic attribute is modeled. This defines a probability density function (PDF). Comparison of the PDF of the model output with the PDF on the measured seismic data is used to determine the likelihood of the selected fluid property.

27 Claims, 6 Drawing Sheets

DETERMINATION OF FLUID PROPERTIES OF EARTH FORMATIONS USING STOCHASTIC INVERSION

BACKGROUND OF THE INVENTION

1. Field of the Invention

This invention relates generally to the field of seismic prospecting and, more particularly, to a method for deriving reservoir lithology and fluid content by stochastic inversion of seismic data.

2. Background of the Art

In the oil and gas industry, seismic prospecting techniques are commonly used to aid in the search for and evaluation of subterranean hydrocarbon deposits. Generally, a seismic energy source is used to generate a seismic signal which propagates into the earth and is at least partially reflected by subsurface seismic reflectors (i.e., interfaces between underground formations having different elastic properties). The reflections are recorded by seismic detectors located at or near the surface of the earth, in a body of water, or at known depths in boreholes, and the resulting seismic data may be processed to yield information relating to the geologic structure and properties of the subsurface formations.

The goal of seismic data processing is to extract from the data as much information as possible regarding the subsurface formations. Data processing techniques have been developed which typically permit the geologic structure of the subsurface formations to be determined with a great deal of accuracy. However, to date, efforts to develop techniques for deriving the fluid content of the subsurface formations have met with only limited success.

It is well known by persons skilled in the art of seismic prospecting that the presence of hydrocarbon accumulations in a subsurface formation can have a significant effect on the velocity of propagation of compressional waves (P-waves) through that formation. This effect is the basis of the so-called "bright spot" phenomenon in which an anomalously high reflection amplitude on a seismic section is an indication of the presence of hydrocarbon accumulations, particularly natural gas, in the formation. Unfortunately, the bright spot phenomenon is susceptible to error because many seismic amplitude anomalies are not caused by hydrocarbon accumulations, or they are caused by hydrocarbon accumulations which are low in total saturation and often non-commercial. For this reason, wells drilled on such bright spots often encounter either no reservoir sands at all (and, therefore, no hydrocarbons), or if the sands are present, no hydrocarbons or only low saturations of hydrocarbons.

One technique which may be useful for this purpose is amplitude variation with offset ("AVO") analysis. In AVO analysis, measurements of P-wave reflection amplitudes with different angles of incidence are used to attempt to determine compressional wave (P-wave) velocity, shear wave (S-wave) velocity, density, and Poisson's ratio for each subsurface layer suspected of containing natural gas. Knowledge of these subsurface elastic properties can be used to predict whether or not natural gas accumulations are present. See e.g., Ostrander, W. J., "Plane-wave reflection coefficients for gas sands at non-normal angles of incidence," Geophysics, v. 49, pp. 1637–1648, 1984, for a discussion of AVO analysis. Ostrander proposes a method for using AVO analysis to distinguish between gas-related amplitude anomalies and non-gas-related amplitude anomalies. However, Ostrander admits that distinguishing between low gas saturation and full saturation can be very difficult.

AVO techniques have been the subject of a number of prior patents. For example, U.S. Pat. No. 4,858,200 to Goins ("the Goins '200 patent") discloses a method for determining the presence of hydrocarbons in subsurface geological formations by comparative assessment of P-wave and S-wave reflection data. The S-wave reflection data is estimated from the P-wave data using variations in the amplitude of the gathered P-wave data with source-receiver offset. Two related patents, U.S. Pat. Nos. 4,858,201 to Goins et al. ("the Goins '201 patent"), and 4,858,202 to Fitch et al. describe two different methods which can be used for obtaining S-wave data from common depth point gathered P-wave traces.

U.S. Pat. No. 4,817,060 to Smith discloses a process for directly detecting the presence of hydrocarbons from seismic data. First, the P-wave and S-wave reflectivities are extracted from the data on a trace-by-trace basis. The P-wave reflectivity is then determined as a function of the S-wave reflectivity and the result is subtracted from the extracted P-wave reflectivity to define a fluid factor which is indicative of the presence of hydrocarbons.

U.S. Pat. No. 5,001,677 to Masters discloses methods for processing and displaying seismic data to emphasize potential hydrocarbon bearing strata. These methods treat measured attributes from the seismic data as components of a vector, estimate a background vector which represents uninteresting geologic behavior, and then form at least one new attribute which quantifies departures from this uninteresting behavior.

The end products of these prior art AVO processes usually are predictions of the P-wave and S-wave reflectivities for the target location. Although some of these prior processes have recognized the desirability of also determining the density reflectivity (see e.g., the patents to Smith and Masters cited above), none has disclosed a method for successfully doing so.

Another technique which may be useful in discriminating between different lithologies and fluid saturations is pre-stack inversion based on either a one-dimensional (1D) or two-dimensional (2D) model of the earth's subsurface. See e.g., Symes, W. W. and Carazzone, J. J., "Velocity inversion by differential semblance optimization," Geophysics, v. 56, pp. 654–663, 1991, and Liao, Quingbo. and McMechan, G. A., "Multifrequency viscoacoustic modeling and inversion," Geophysics, v. 61, pp. 1371–1378, 1996.

As will be well known to persons skilled in the art, seismic inversion is a process for deriving a model of the earth's subsurface from seismic reflection data. First, the process attempts to extract information regarding the elastic properties of the subsurface from the data. This information is then used to construct a mathematical or physical model of the earth's subsurface, and synthetic seismograms are generated based on the model. If the synthetic seismograms do not compare favorably to the data, appropriate adjustments are made to the model, and new synthetic seismograms are generated for comparison with the data. This process repeats until the synthetic seismograms generated from the model approximate the actual data. The model is then accepted as accurate.

Pre-stack inversion processes typically attempt to estimate both the background P-wave velocity model and the contrast in various elastic parameters (P-wave velocity, S-wave velocity, and density) and, therefore, are non-linear. Thus, these techniques are extremely complex.

U.S. Pat. No. 5,583,825 to Carrazzone et al. describes a method for deriving reservoir lithology and fluid content for a target location from pre-stack seismic reflection data. The method uses inversion of pre-stack seismic reflection data for both the target location and a calibration location having known subsurface lithology and fluid content to derive the subsurface lithology and fluid content at the target location. The inversion process is preferably a viscoelastic inversion to account for the effects of friction on seismic wave propagation. The results of the inversion process are a set of subsurface elastic parameters for both the target and calibration locations. Relative magnitudes of these subsurface elastic parameters are compared, together with the known subsurface lithology and fluid content at the calibration location, to derive the subsurface lithology and fluid content at the target location.

The method of Carrazzone, while giving results superior to those in earlier techniques, still requires an inversion of seismic data and still carries out a two step procedure. In the first step, an inversion of the pre-stack seismic reflection data is carried out to determine the selected set of elastic parameters at each of a plurality of points in the models of the subsurface target and calibration locations. In the second step, the relative magnitudes of the elastic parameters for the subsurface target and calibration locations are compared; and using the results of the comparison and the known lithology and fluid content at the subsurface calibration location the lithology and fluid content at the subsurface target location are derived.

A problem with all of the prior art methods is the two step procedure, explicit or implicit, used for obtaining fluid properties. There inversion of seismic data to obtain reflection coefficients (or elastic parameters) is by itself difficult. The second step of determination of fluid properties from reflection coefficients requires an inversion procedure that is very sensitive to the unknown parameters being determined. A variety of parameters must be used and some of these parameters must be obtained outside the inversion itself. It would be desirable to have a robust method of determination of fluid parameters of subsurface formations that also takes into account the relative uncertainty in knowledge of subsurface rock formations. The present invention satisfies this need.

SUMMARY OF THE INVENTION

The present invention is a method for determining a parameter of interest of a fluid in a subsurface region of earth formations. Seismic survey data are obtained over the subsurface region and a horizon of interest is identified. One or more seismic attributes of the horizon of interest are measured and a first probability density function (PDF) for the seismic attribute(s) is determined. A rock properties model is defined consistent with expected values and a plurality of perturbations of the model is obtained. For each of the plurality of models and a trial value of a fluid property, a PDF of the seismic attribute(s) is determined. By comparing the first and second PDFs, an estimate of the fluid property is made. When either the number of seismic attributes or the number of fluid properties is more than one, the PDF is multivariate Any one of the commonly used seismic survey types (P—P, P—S, S—S, and S—P) may be used.

Any of the commonly used seismic attributes may be measured. These include impedance, amplitude, a reflectivity, density, traces obtained by AVO processing. The rock properties model includes properties of a seal rock and a reservoir rock. The model may be based on two half spaces in contact or may consist of a reservoir rock sandwiched between two half spaces of seal rock. In the latter case, a tuning curve is determined based on an overburden model.

Determination of the PDF for the fluid may be based on a convolutional model. There is wide latitude in defining the wavelets for the convolutional model. These include a wavelet derived from a bandpass filter, a Berlage wavelet, (iii) a wavelet derived from a Butterworth filter, (iv) a Gabor wavelet, (v) a Gaussian wavelet, (vi) an Ormsby wavelet, (vii) a Rayleigh wavelet, and, (viii) a Ricker wavelet. The rock properties for the model may be based on trend curves. Compressional wave velocities for the models are directly derived from trend curves, whereas shear velocities and densities are based on deviations from expected values based on correlations with compressional wave velocities.

The fluid property may be one or more of a fluid modulus, a density, and, a fluid saturation.

BRIEF DESCRIPTION OF THE DRAWINGS

The file of this patent contains at least one drawing executed in color. Copies of this patent with color drawings (s) will be provided by the Patent and Trademark Office upon request and payment of the necessary fee. The present invention will be better understood by referring to the following detailed description and the attached drawings in which.

DETAILED DESCRIPTION OF THE PREFERRED EMBODIMENTS

Seismic reflection data provides information about reflection coefficients. Depending on source and receiver types, one can obtain compressional, shear or converted wave reflection coefficients. Reflection coefficients also vary with the incidence angle of the reflections. These various reflection coefficients and their angle dependence provide a variety of information about the two rocks at whose contact the reflection occurs.

But reflection coefficients have one big limitation: they contain information about the pore fluids only in an indirect fashion. It is the pore fluid properties (modulus, density and hydrocarbon saturation) that we would like to have, because they are directly related to the economics of the prospect.

Unfortunately, we know that deriving pore fluid properties from seismic data is usually an ill-conditioned process. A variety of rock physics parameters must be known to go from reflection coefficients to pore fluid properties, and these are not known with great precision. In fact, variations in these parameters can mimic the effects of pore fluid variations on the reflection coefficients.

The present invention is a method that estimates the pore fluid parameters, and, at the same time, also quantifies the uncertainty in the estimates, given our uncertainties in the rock properties and the seismic measurements. This is done by producing a probability density function (PDF) which gives the probability that the observed seismic is consistent with a given pore fluid property.

This PDF contains all the information about the pore fluid property that can be obtained from the seismic measurement, given the uncertainties in our knowledge. The PDF contains the most likely value of the pore fluid property. The PDF also quantifies the uncertainty in the best estimate. The PDF can also be integrated to give the probability for a range of values (e.g., those that are likely to reflect pay).

The PDF also quantifies how much information is gained from the quantitative seismic information. This process can incorporate all the rock properties, log data, etc. that we have about the problem. If new information is added, we can incorporate it to obtain a new (sharper) PDF. Thus we can quantify the importance of new information, be it rock properties data or additional seismic measurements.

Figure 1:
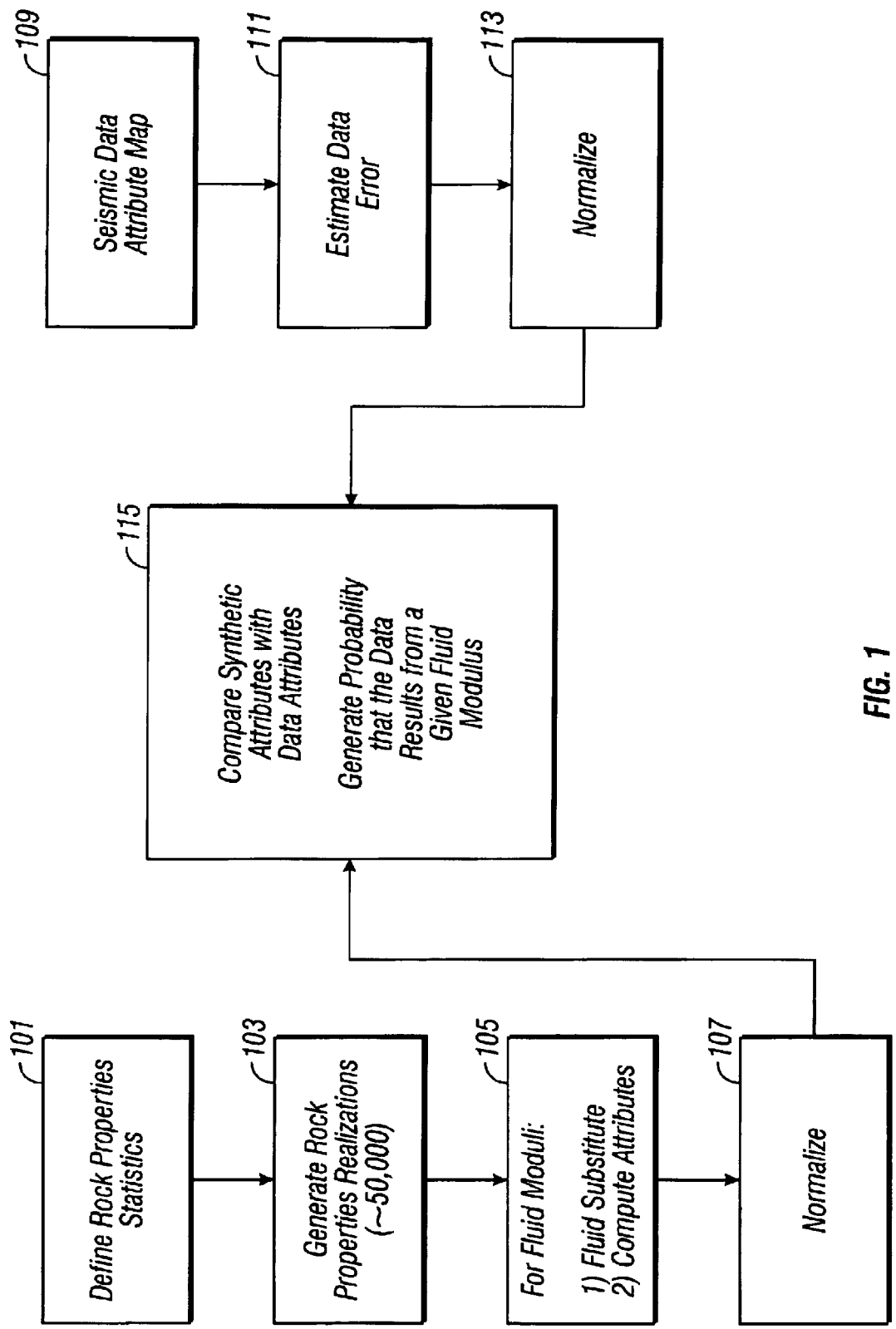
FIG. 1 is a flow chart showing an overview of the preferred embodiment of the invention.

Turning to FIG. 1, there are two broad streams of processing. The left hand side depicts processing that is used for generation of synthetic data. This may be referred to as the simulation. The right hand side depicts the processing done to real data. The simulation process starts with a definition of rock properties 101. These are characterized statistically and are discussed in detail later in the application. Each parameter is described by a statistical distribution. A plurality of realizations (typically, tens of thousands) are drawn from these distributions 103. The variables are chosen to be (nearly) uncorrelated. Associated with each of these realizations is a value of a pore fluid property chosen to be at the center of a bin. The pore fluid property may be one or more of the fluid modulus, the fluid density, the fluid saturation (for multi-component fluids), etc. For each realization a value of compressional and shear velocities and density (Vp, Vs and p) are determined for the caprock (seal) and reservoir rock. This may be done for both a test region (where fluid properties are to be determined), and a reference region where fluid properties are known (in a statistical sense).

For the realizations, equidistributed sequences are used over specified ranges. This makes it possible to use fewer realizations than would be necessary if random number sequences were used for defining the rock properties. Using the values of $V_p$, $V_s$, and $\rho$, reflection coefficients are determined. Mathematically, they are obtained by a solution of Zoeppritz's equations, (given in a classic paper in 1919). A convenient form of the equations is given in *The Rock Physics Handbook* and is reproduced in the Appendix. In a preferred embodiment of the invention, the isotropic form of Zoeppritz's equations. This is not intended to be a limitation, and the method of the present invention could also be used with an anisotropic form of Zoeppritz's equations given, for example, in *The Rock Physics Handbook*.

In one embodiment of the invention (called the impedance model), reservoir impedances are determined. In this embodiment, the seismic data must be inverted to determine reservoir impedance. In a second embodiment of the invention, an assumption is made that there are two half spaces in contact, one a seal, the other a reservoir. The selected horizon may be either the top or the bottom of the reservoir. This may be referred to as the two half-spaces model. The corresponding seismic data must also satisfy this assumption. In a third embodiment of the invention, a reservoir layer is interposed between two half spaces of caprock, whose properties are assumed to be the same above and below the reservoir. This may be referred to as a sandwich model. The two half-spaces model and the sandwich model both assumes a convolutional model. For the two half-spaces model, a convolutional model may be used. However, in a preferred embodiment of the invention As would be known to those versed in the art, in a convolutional model, the seismic response is modeled by convolving a wavelet with a reflectivity sequence. For the sandwich model, a tuning curve (derived from the source wavelet) is used to replace the two reflections (one from the top and one from the bottom of the reservoir) with an equivalent single reflection, and the rest of the processing proceeds as for the two half-spaces model.

In one embodiment of the invention (called the impedance model), reservoir impedances are determined. In this embodiment, the seismic data is inverted to determine reservoir impedance. In a second embodiment of the invention, an assumption is made that there are two half spaces in contact, one a seal, the other a reservoir. The selected horizon may be either the top or the bottom of the reservoir. This may be referred to as the two half-spaces model. The corresponding seismic data must also satisfy this assumption. In a third embodiment of the invention, a reservoir layer is interposed between two half spaces of caprock, whose properties are assumed to be the same above and below the reservoir. This may be referred to as a sandwich model. The two half-spaces model and the sandwich model both assume a convolutional model. As would be known to those versed in the art, in a convolutional model, the seismic response is modeled by convolving a wavelet with a reflectivity sequence. For the two half-space model, the reflection amplitude is assumed to be a reflection coefficient multiplied by the amplitude of the wavelet at the time picked (e.g. at the peak of the wavelet). It is assumed on input that either the wavelet amplitude scale factor is removed or that the input will be normalized internally. For the sandwich model, a tuning curve (derived from the source wavelet) is used to replace the two reflections (one from the top and one from the bottom of the reservoir) with an equivalent single reflection, and the rest of the processing proceeds as for the two half-spaces model.

Returning now to FIG. 1, using the various realizations of the formation plus fluid models, seismic attributes are determined 105. The seismic attributes are based on the impedance (for the impedance model) and on reflection coefficients for the two half-spaces model and the sandwich model. The synthetic data are then normalized 107.

The processing of the real seismic data (on the right side of FIG. 1) starts with the seismic data 109. It is input as the values on a mapped horizon. Next, the errors in the data are estimated 111. It is assumed that the errors are distributed normally, with the mean value(s) being the input value(s). The standard deviation(s) may be input by the user and are a specified parameter. In one embodiment of the invention, the PDFs are assumed to be laterally invariant. In an alternate embodiment of the invention, the PDFs could vary laterally. Alternatively, the data errors may be estimated data using pre-stack data. The data are then normalized 113 using the reference region, if the absolute scale of the seismic data is not available. Use of the reference region is as in prior art, i.e., the values of the attributes on real seismic data in the reference region (where the rock and fluid properties are known) are used to normalize the seismic data elsewhere.

The (normalized) synthetic and (normalized) real data are then compared 115. Based on this, a probability that the real data results from a given value of the fluid properties is determined. The determination of this probability is depicted schematically in FIG. 2.

Figure 2:
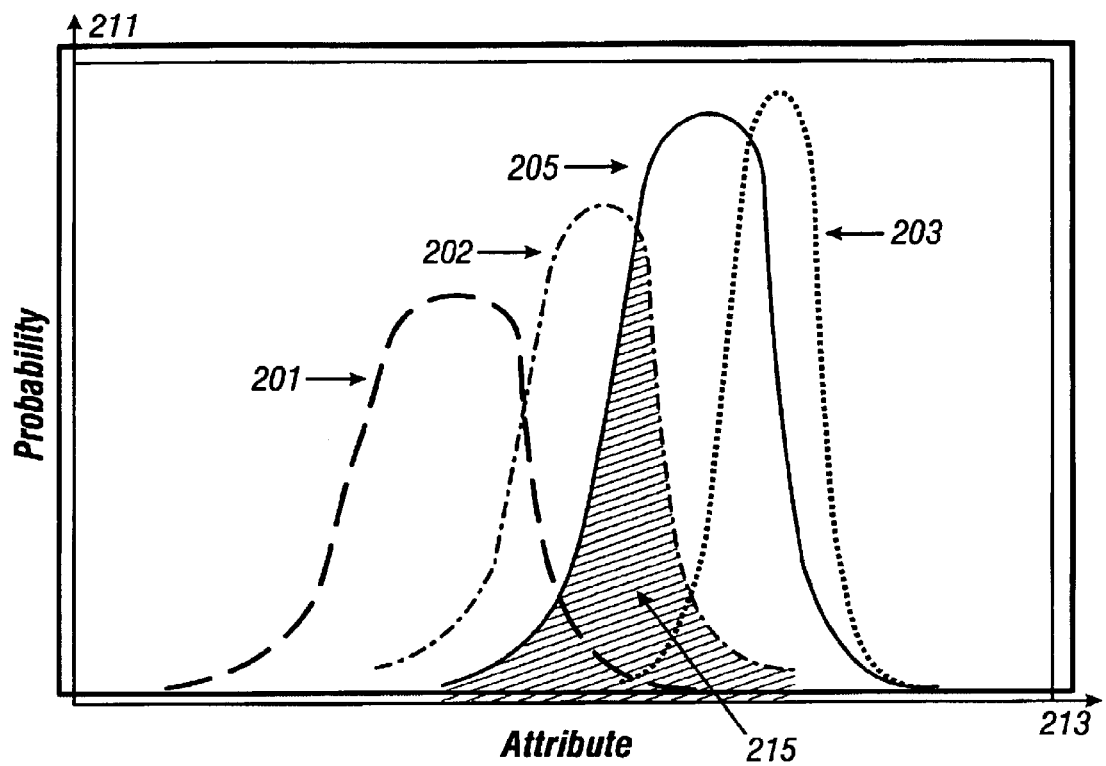
FIG. 2 is a schematic illustration showing the marginal probability density functions for an attribute for the data and three different models.
Figure 3:
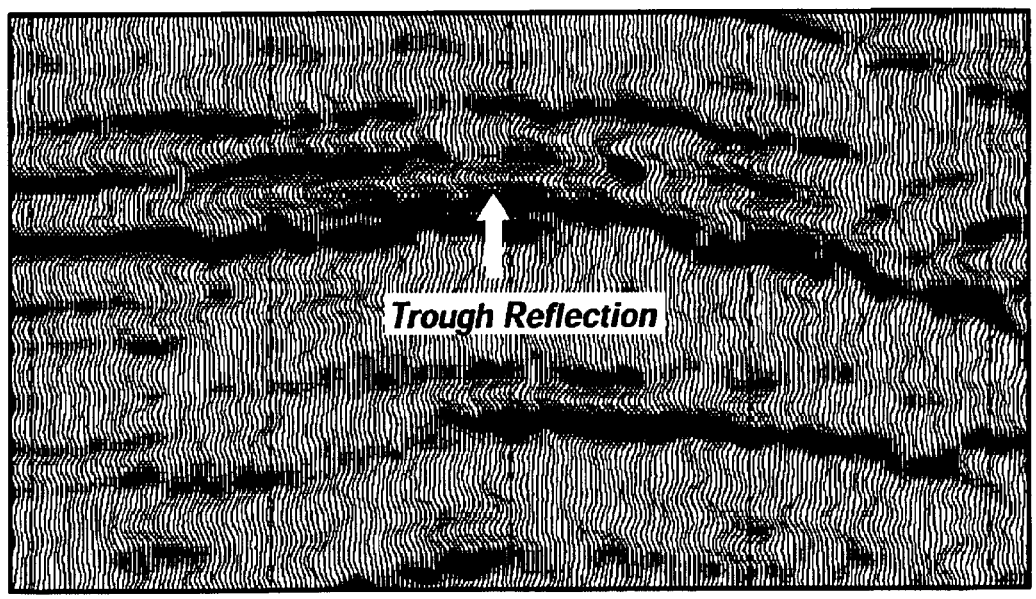
FIG. 3 is an example of seismic data from the Gulf of Mexico including a horizon of interest.

Turning now to FIG. 2, the curve 205 depicts the PDF of a selected attribute for a single point on a seismic horizon. The center of the distribution is the measured value of attribute on the real data at the selected point. Also shown in FIG. 3 are different PDFs (201, 202, 203) on the synthetic data for a different selected value of the pore fluid property that is to be determined. Three curves are depicted purely for illustrative purposes and is not intended to be a limitation. The hatched area 215 is a measure of the probability that the observed value corresponds to the fluid property that was used to generate the curve 202. Similar hatched areas can be determined for the other hypothetical values of the fluid properties that gave the curves 201 and 203. For the example shown, the fluid property values that gave rise to the curve 202 is the most likely value for the real data. The area under both curves (hatched region) is a measure of the probability that the observed value is the result of the chosen pore fluid property. Using this, an a posteriori probability for the fluid property (e.g., fluid modulus, the fluid density, the fluid saturation) in question can be calculated The example given above in FIG. 2 dealt with a PDF for a single attribute. This methodology can be extended to the measurement of multiple attributes, in which case, a joint PDF would be used.

One of the important steps in the invention is the realization of the rock properties model and the effects of fluid modulii (103 and 105) in FIG. 1. Some important considerations in these two subprocesses are discussed next.

One of the principles used in the modeling is that the P and S velocities of rocks should trend between the velocities of the mineral grains in the limit of low porosity and the values for a mineral-pore fluid suspension in the limit of high porosity. See Nur et al (1995). This idea is based on the observation that for most porous materials, there is a critical porosity, $\phi_c$, that separates their mechanical and acoustic behavior into two distinct domains. For porosities lower than $\phi_c$ the mineral grains are load bearing, whereas for porosities greater than $\phi_c$ the rock falls apart and becomes a suspension in which the fluid phase is load bearing. Based on this, for $\phi > \phi_c$, the effective bulk modulii and the shear modulii can be estimated quite accurately using the Reuss average:

$$K_R^{-1} = (1-\phi)K_0^{-1} + \phi K_{fl}^{-1}; \quad \mu_R = 0 \qquad (1)$$

where $K_R$, $K_0$, and $K_{fl}$ are the bulk modulii of the rock, matrix and fluid respectively, and $\mu_R$ is the shear modulus of the rock.

In load bearing rocks, the modulii decrease rapidly from the mineral values at zero porosity to the suspension values at the critical porosity. Nur found that this dependence can often be approximated with a straight line when expressed $\rho V^2$ versus porosity. For dry rocks, the bulk and shear modulii can then be expressed as:

$$K_{dry} = K_{gr}\left(1 - \frac{\phi}{\phi_c}\right) \qquad (2)$$

$$\mu_{dry} = \mu_{gr}\left(1 - \frac{\phi}{\phi_c}\right)$$

In a preferred embodiment of the invention, a modified form of the equations given by Nur are used:

$$K_{dry} = K_{gr}\left(1 - \frac{\phi}{\phi_c}\right)^r \qquad (2a)$$

$$\mu_{dry} = \mu_{gr}\left(1 - \frac{\phi}{\phi_c}\right)^r$$

where r is an exponent. It has been found that this model gives a better result than the one given by Nur.

In a preferred embodiment of the invention, the rock properties are specified as follows.

SEAL ROCK PROPERTIES are determined from user specified trend curves from the relations:

$$V_s = \text{Trend function } (V_p)$$

$$\rho = \text{Trend function } (V_p) \qquad (3).$$

Such trend curves are well known in the art and are usually compiled from measurements made in wells on a local scale, a prospect scale, or on a basin-wide scale. Usually, the sampling of the subsurface by wells is rather sparse on a local scale; hence trend curves are preferably obtained on a prospect scale or a basin-wide scale. In a preferred embodiment of the invention, a trend function of $V_p$ is specified. The plurality of realizations are based on perturbations of $V_p$ about this trend curve. As is well known, there is a strong correlation between $V_s$ and $V_p$. Hence in a preferred embodiment of the invention, the plurality of realizations are specified in terms of perturbations of $V_s$ about the trend. Thus, if $\delta V_p$ is a perturbation of $V_p$ and if $\Delta V_s$ is the expected deviation in $V_s$ for a perturbation $\delta V_p$ in $V_p$, then a perturbation $\delta V_s$ is specified as additional to $\delta V_s$. This ensures that the realizations comprise uncorrelated perturbations. A similar step is taken with respect to density, which is also known to be highly correlated with $V_p$.

RESERVOIR ROCK PROPERTIES are determined using the well known Gassman equations and trend curves as:

$$K_{dry} = K_{grain}(1 - \phi/\phi_c)^r \text{ (critical porosity model)} \qquad (4)$$

$$\rho = \rho_{grain}(1 - \phi) + \rho_{fluid}\phi$$

$$\mu = \text{trend function } (K_{dry}) \qquad (5)$$

$$1/K_{fluid} = (1 - S_g)/K_{brine} + S_g/K_{gas} \text{ (for gas saturated fluid)} \qquad (6)$$

$$= (1 - S_o)/K_{brine} + S_o/K_{oil} \text{ (for oil saturated fluid)}$$

$$\rho_{brine} = \text{Trend\_function}(K_{brine}) \qquad (7)$$

$$\rho_{gas} = \text{Trend\_function}(K_{gas}) \qquad (8)$$

$$\rho_{fluid} = (1 - S_g)\rho_{brine} + S_g\rho_g \text{ (gas saturated fluid)} \qquad (9)$$

$$= (1 - S_o)\rho_{brine} + S_o\rho_g \text{ (oil saturated fluid)}$$

$$K = K_{dry} + \frac{(1 - K_{dry}/K_{grain})^2}{((1 - \phi - K_{dry}/K_{grain})/K_{grain} + \phi/K_{fluid})} \qquad (10)$$

(from Gassman)

$$V_p = \sqrt{((K + 4\mu/3)/\rho)} \qquad (11)$$

$$V_s = \sqrt{(\mu/\rho)} \qquad (12)$$

The single phase fluid density $\rho$ from the K trend function is:

$$\rho = .375 K^{1/2} \quad \text{for } K < .1 \quad \text{(Gas region) and} \tag{13}$$

$$\rho = .75 K^{1/3} \quad \text{for } K > .15 \quad \text{(Liquid region)}.$$

These equations are based on the density having units of g/cm$^3$ and the modulii being in GPa. Expressions for other units are easy to derive. For the reservoir the stochastic variables are $K_{grain}$, $\rho_{grain}$ porosity, critical porosity, exponent r (see above), change of shear modulus from trend, brine modulus, brine density deviation from trend.

Another important consideration in FIG. 1 is the normalization of the data 107, 113. In a preferred embodiment of the invention, a normalization of the form:

$$D_{norm} = D_{test}/\sqrt{(D_{test}^2 + D_{ref}^2)} \tag{14}$$

is used. This choice of form prevents the large values when either data value is near zero. The reference region will normally contain many points. A small but representative subset of these is chosen and processed for each case and the resulting PDFs. are averaged. This is the equation for generating the normalized input data, $D_{norm}$, from the input data value in the test region, $D_{test}$, and the input value in the reference region, $D_{ref}$.

The invention can use data (and attributes) from a variety of formats. Some of the more common options for the data are:
1. Both compressional and shear wave data may be used.
2. The data may be stacked or unstacked.
3. Mode converted data (PS or SP) are acceptable.
4. Data may have been processed using commonly used AVO analysis. Specifically, A, B, C, D and E traces may be used as commonly defined.
5. Data may have been processed to give reflectivities $R_p$, $R_s$, and impedances $Z_p$ and
6. Broad flexibility exists in the wavelet definition. Among the commonly used wavelets are (i) a wavelet derived from a bandpass filter, (ii) Berlage, (iii) a wavelet derived from a Butterworth filter, (iv) a Gabor wavelet, (v) a Gaussian wavelet, (vi) an Ormsby wavelet, (vii) a Rayleigh wavelet, and, (viii) a Ricker wavelet. These wavelets would be known to those versed in the art and are not discussed further.
7. When prestack data are analyzed. an overburden model may be defined in terms of velocity and density to make appropriate calculations of the angle of incidence.

These are only a sampling of some of the more important parameters that may be defined.

Figure 4:
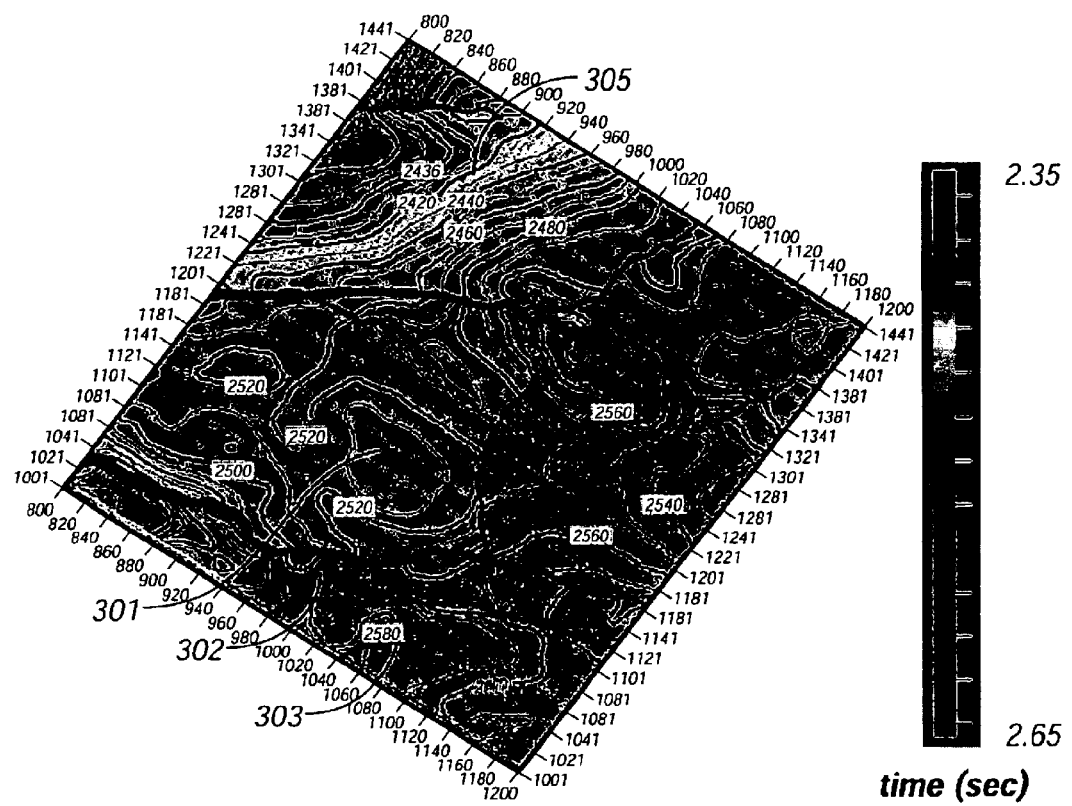
FIG. 4 shows a seismic structure map for the horizon of interest.

With the above in mind, the attributes used in the analysis may be selected from the list below. Reference is made to prior art methods of analysis of offset dependent seismic traces wherein:

$$R(\theta) = A + B \sin^2(\theta) + C \sin^2(\theta) \tan^2(\theta) \tag{15, and}$$

$$R(\theta) = D \sin(\theta) + E \sin^3(\theta) \tag{16},$$

where R(θ) is a seismic trace corresponding to an angle of incidence θ, and A, B, C, D and E are fitting parameters. As would be known to those versed in the art, eq. 15 which is a Taylor series expansion in even powers of Sin θ would be used for either P—P (incident compressional wave, reflected compressional wave) or for S—S (incident shear wave, reflected shear wave) data, while eq. (16) which is a Taylor series expansion in odd powers of Sin θ would be used for (P—S) or (S—P) data. An example of such a method is given (for P—P data) in U.S. Pat. No. 4,995,007 to Corcoran et al. The measured attributes are then one or more of:

1. $Z_p$ the compressional wave impedance,
2. $Z_s$ the shear wave impedance (shear),
3. P-Wave stack amplitude,
4. S-Wave stack amplitude
5. PS converted stack amplitude,
6. SP converted stack amplitude,
7. AVO attribute A (P-wave),
8. AVO attribute D (PS Converted),
9. AVO attribute A (S-Wave),
10. AVO attribute D (SP Converted),
11. Reflectivity (P—P),
12. Reflectivity (S—S),
13. Impedance (P- and S-),
14. Reflectivity (P- and S-),
15. Stack amplitude (P- and S-),
16. AVO attributes A and B (P-waves),
17. AVO attributes D and E (PS converted waves),
18. AVO attributes A and B (S-wave),
19. AVO attributes D and E (SP converted waves),
20. AVO attributes A, B and C (P-wave)
21. AVO attributes A, B and C(S-Waves)
22. Reflectivities (P and S), fractional change in density, and average (Vp/Vs)$^2$ Turning next to FIG. 3, an example of a seismic line is shown. This is a line of P—P data. Indicated by the arrow is a horizon of interest for which an estimate of the fluid content is to be determined. FIG. 4 shows a seismic structure map for an area of interest. Contours of equal reflection times of the horizon of interest are indicated. There are several faults in the area, indicated by the dark blue lines. Attention is drawn to the fault blocks indicated by 301, 302, 303 and 305 which will be discussed further below. In addition to the contours, the color is an indication of the depth of the horizon (the scale ranges from 2.35 to 2.65 seconds). Several wells have been drilled in the area as shown by the red dots in FIG. 4. Data from these wells may be used to define the rock properties and fluid properties at known calibration points in the area.

Figure 5:
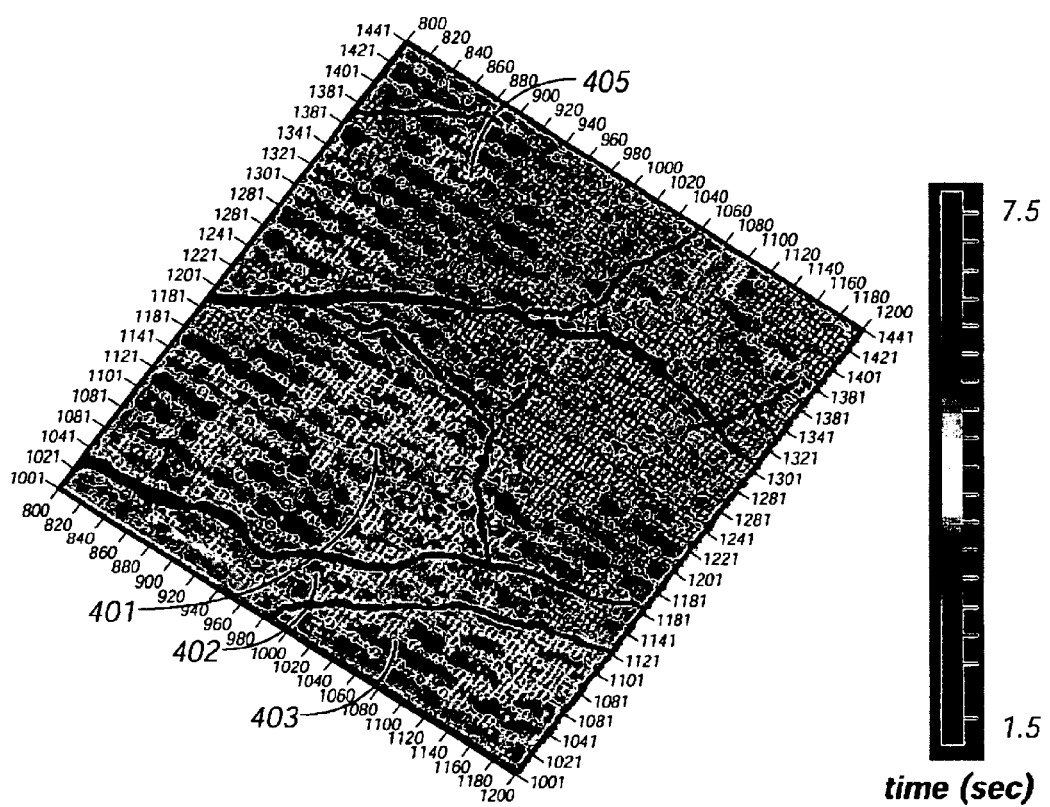
FIG. 5 is shows the seismic amplitude for the horizon of interest for the area shown in FIG. 4.

FIG. 5 is a display of the seismic amplitude over the region of interest. As can be seen, the amplitudes are the highest in block 301 as indicated by the red color, while they are the lowest in block 305 ad indicated by the blue color. Intermediate values of the amplitude are noted in blocks 303 and 303. Qualitatively, the high amplitudes (red values in FIG. 5 and the strong amplitudes seen in FIG. 3 at the horizon of interest) are indicative of gas. The rest of the analysis used only the amplitude of the P—P stack as an attribute.

Figure 6:
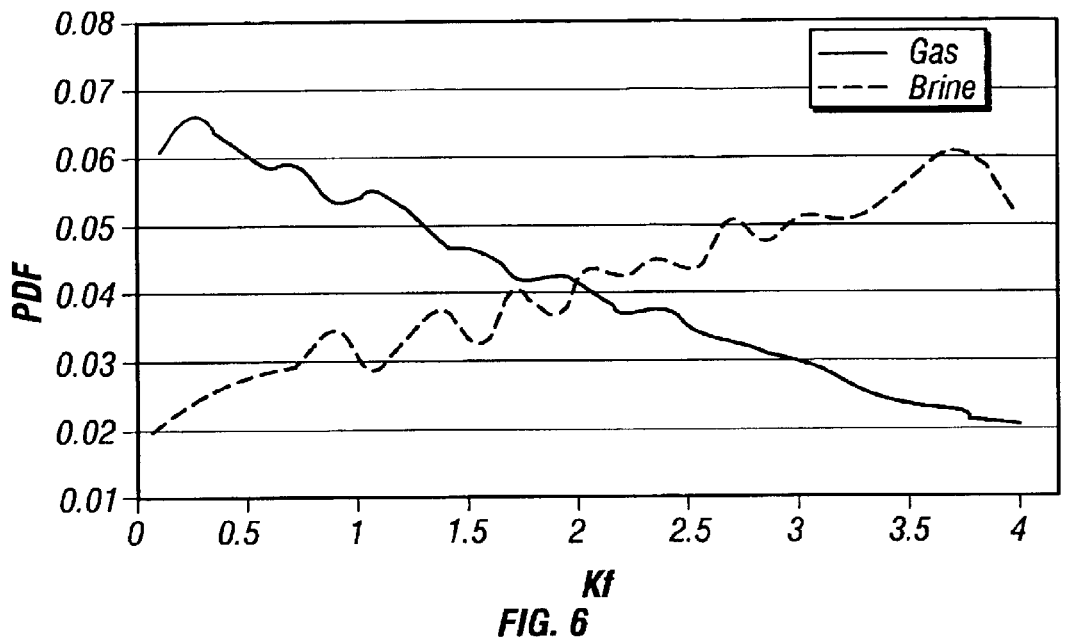
FIG. 6 is an example of a PDF for the fluid bulk modulus for a gas filled interval and a brine filled interval.
Figure 7:
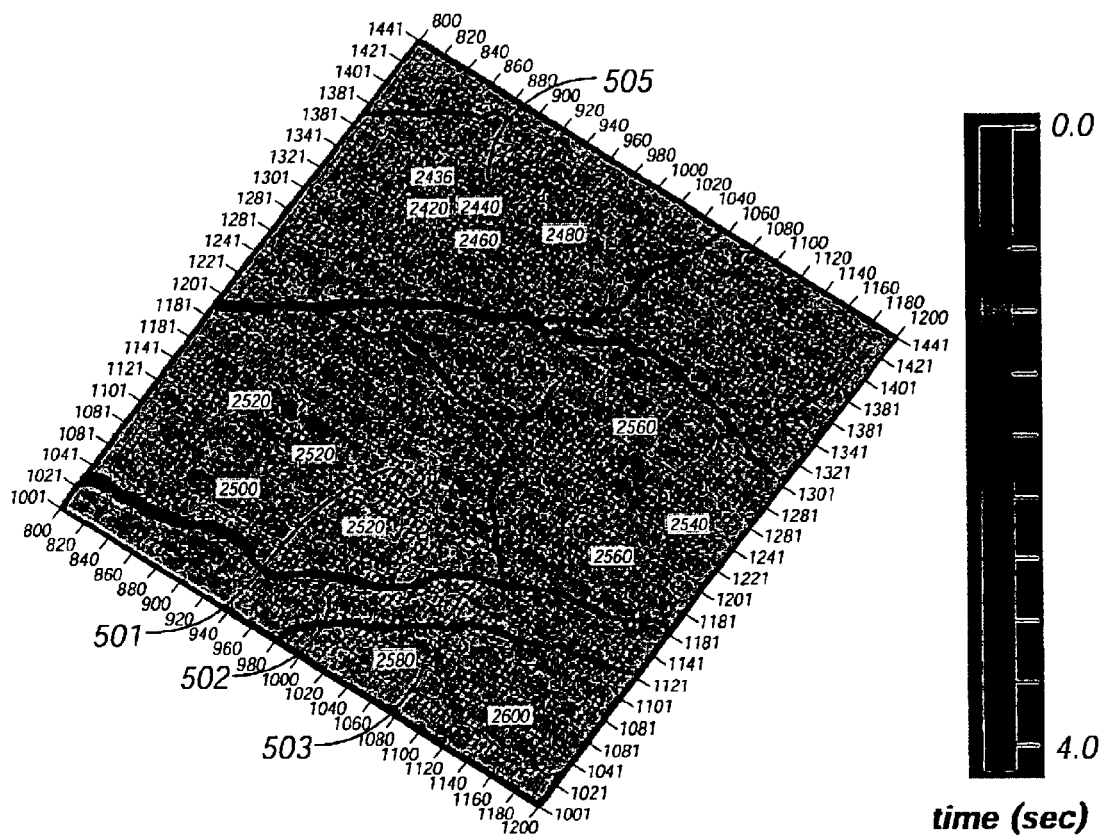
FIG. 7 is a plot of the most likely fluid modulus over the area shown in FIG. 4.

Turning to FIG. 6, a plot is shown of the PDF that would results from a gas filled interval and a brine filled interval. Not surprisingly, a brine filled interval has a high PDF at a large value of the fluid bulk modulus while a gas filled zone has a high PDF at a small value of modulus. FIG. 7 shows the most likely value of the fluid modulus (in GPa) over the region of interest. As can be seen, the crest of the structure in block 301 has the lowest likely value fluid modulus (indicative of gas) while the block 305 has the highest likely value of fluid modulus (indicative of brine); blocks 302 and 303 have intermediate values. One might infer that the structure has gas. However, any conclusion based on the data that the reservoir has a high gas saturation would be unjustified for reasons discussed next.

Figure 8:
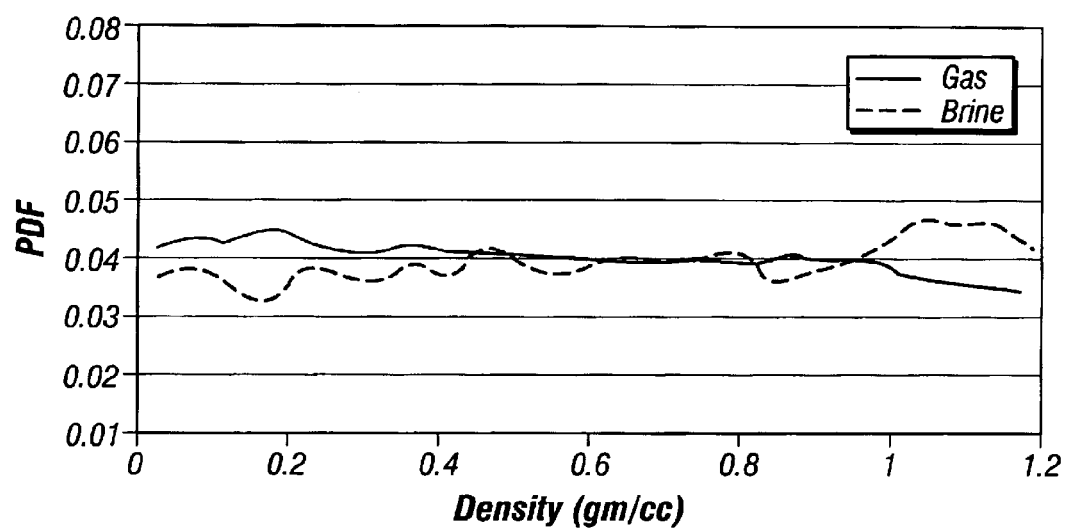
FIG. 8 is an example of a PDF for the density for a gas filled interval and a brine filled interval.

As would be known to those versed in the art, eq. (6) shows that low fluid modulus is not particularly diagnostic of high gas saturation. There is a common occurrence of what is called low saturation gas (LSG) wherein strong seismic reflections and low fluid modulus result from low values of $S_g$. It is important to get an estimate of the density as well. Eq. (9) shows that the fluid density is sensitive to the gas saturation. However, in the present example, just using the seismic amplitude alone provides very little information about the fluid density. This can be seen from FIG. 8 which shows a plot of the PDF for gas and brine filled intervals that could be obtained using the amplitude as the only attribute. FIG. 8 shows that no inference can be drawn about the fluid density (or gas saturation) from the seismic data when the P—P amplitude is the only seismic attributes. Other attributes must be included.

In a preferred embodiment of the invention, P—P seismic data are used, the attributes measured are A and B for the data, and the fluid parameters for which the PDFs are determined are the fluid modulus and the fluid density.

The foregoing description has been limited to specific embodiments of this invention. It will be apparent, however, that variations and modifications may be made to the disclosed embodiments, with the attainment of some or all of the advantages of the invention. Therefore, it is the object of the appended claims to cover all such variations and modifications as come within the true spirit and scope of the invention.

Appendix

The general formulation for a plane wave incident on an interface between two half spaces is given by $$\begin{pmatrix} P\downarrow P\uparrow & S\downarrow P\uparrow & P\uparrow P\uparrow & S\uparrow P\uparrow \\ P\downarrow S\uparrow & S\downarrow S\uparrow & P\uparrow S\uparrow & S\uparrow S\uparrow \\ P\downarrow P\downarrow & S\downarrow P\downarrow & P\uparrow P\downarrow & S\uparrow P\downarrow \\ P\downarrow S\downarrow & S\downarrow S\downarrow & P\uparrow S\downarrow & S\uparrow S\downarrow \end{pmatrix} = M^{-1}N \quad\text{(A-1)}$$

where the first arrow defines the direction of the incident wave and the second arrow defines the direction of the reflected wave and where the matrices M and N are given by $$M = \begin{bmatrix} -\sin\theta_1 & -\cos\phi_1 & \sin\theta_2 & \cos\phi_2 \\ \cos\theta_1 & -\sin\phi_1 & \cos\theta_2 & -\sin\phi_2 \\ 2\rho_1 V_{s1}\sin\phi_1\cos\theta_1 & \rho_1 V_{s1}(1-2\sin^2\phi_1) & 2\rho_2 V_{s2}\sin\phi\cos\theta & \rho_2 V_{s2}(1-2\sin^2\phi_2) \\ -\rho_1 V_{p1}(1-2\sin^2\phi_1) & \rho_1 V_{s1}\sin2\phi_1 & \rho_2 V_{p2}(1-2\sin^2\phi) & -\rho_2 V_{s2}\sin2\phi_2 \end{bmatrix} \quad\text{(A-2)}$$

and $$N = \begin{bmatrix} \sin\theta_1 & \cos\phi_1 & -\sin\theta_2 & -\cos\phi_2 \\ \cos\theta_1 & \sin\phi_1 & \cos\theta_2 & -\sin\phi_2 \\ 2\rho_1 V_{s1}\sin\phi_1\cos\theta_1 & \rho_1 V_{s1}(1-2\sin^2\phi_1) & 2\rho_2 V_{s2}\sin\phi\cos\theta & \rho_2 V_{s2}(1-2\sin^2\phi_2) \\ \rho_1 V_{p1}(1-2\sin^2\phi_1) & -\rho_1 V_{s1}\sin2\phi_1 & -\rho_2 V_{p2}(1-2\sin^2\phi) & \rho_2 V_{s2}\sin2\phi_2 \end{bmatrix}$$

In the equations, the angles $\theta$ and $\phi$ refer to the angles of P- and S-waves respectively in a first and second medium separated by a plane interface, $V_P$, $V_S$ and $\rho$ refer to P- and S-velocities and densities and the subscripts refer to the first and second medium. Various approximations of solutions of Zoeppritz's equations have been made.

For normal incidence, the solutions are of the form:

$$R_{pp} = \frac{\rho_1 V_1 - \rho_2 V_2}{\rho_1 V_1 + \rho_2 V_2} \quad\text{(A-3)}$$

For small angles of incidence of an incident P-wave, the reflection coefficient $R_{pp}(\theta)$, of the reflected P-wave i.e, the P↑P↓ term above, has a value that is approximately given by $$R_{pp}(\theta) \approx A + B\sin^2\theta \quad\text{(A-4)}$$

where the coefficient B depends upon the difference in shear velocity across the reflecting interface. Similarly, the reflection coefficient $R_{ps}(\theta)$ of the reflected shear wave for an incident P-wave is approximately given by a relation of the type $$R_{ps}(\delta) = C\sin(\delta) \quad\text{(A-5)}$$

Qualitatively, the amplitude of the reflected P-wave depends upon the angle of incidence of the P-waves at the interface.

What is claimed is:

1. A method for determining a parameter of interest of a fluid in a subsurface region of earth formations comprising:
   (a) obtaining seismic survey information about the subsurface region;
   (b) identifying at least one seismic horizon of interest from the obtained survey information;
   (c) measuring at least one seismic attribute for the at least one horizon of interest at a plurality of locations, and obtaining a first probability density function (PDF) thereof;
   (d) defining a plurality of realizations of a model including at least one rock property in the region of interest;
   (e) defining at least one trial value of at least one property of said fluid and obtaining from said at least one trail value and said plurality of realizations of said model a second PDF associated with said at least one seismic attribute and said fluid property; and
   (f) determining from the first and second probability density functions said parameter of interest.

2. The method of claim 1 wherein said seismic survey is at least one of the group consisting: (i) a P—P survey, (ii) a P—S survey, (iii) a S—S survey, and, (iv) a S—P survey.

3. The method of claim 1 wherein said at least one seismic horizon corresponds to one of (i) a top of a reservoir, (ii) a bottom of a reservoir, and, (iii) a reservoir between an upper and a lower seal.

4. The method of claim 1 wherein said at least one seismic attribute is selected from the group consisting of (i) an impedance, (ii) an amplitude of a stack trace, (iii) at least one coefficient of a Taylor series expansion of an amplitude in powers of $\sin\theta$, (iv) a reflectivity, (iv) a fractional change in density, and, (v) an average value of $(V_p/V_s)^2$.

5. The method of claim 1 wherein the plurality of locations includes a reference location where the parameter of interest is known.

6. The method of claim 1 wherein the plurality of locations includes a test location where the parameter of interest is to be determined.

7. The method of claim 1 wherein obtaining said first PDF further comprises:
   (i) measuring said at least one seismic attribute at a plurality of locations;
   (ii) determining a variability of said seismic attribute at said plurality of locations in (i); and
   (iii) determining an indication of variability of said at least one seismic attribute.

8. The method of claim 1 wherein said at least one seismic attribute comprises a plurality of seismic attributes.

9. The method of claim 4 wherein said at least one seismic attribute comprises a plurality of seismic attributes.

10. The method of claim 8 wherein said first PDF comprises a multivariate PDF.

11. The method of claim 9 wherein said first PDF comprises a multivariate PDF.

12. The method of claim 1 wherein the at least one rock property is a property of a seal rock.

13. The method of claim 1 wherein the at least one rock property is a property of a seal rock.

14. The method of claim 1 wherein said at least one property is a compressional wave velocity.

15. The method of claim 1 wherein said at least one seismic horizon corresponds to one of a reservoir between an upper and a lower seal, the method further comprising determining a tuning curve.

16. The method of claim 15 wherein determining said tuning curve further comprises defining an overburden model.

17. The method of claim 1 wherein determining said second PDF further comprises using a convolutional model.

18. The method of claim 17 further comprising defining a wavelet for said convolutional model.

19. The method of claim 18 wherein said wavelet is selected from the group consisting of (i) a wavelet derived from a bandpass filter, (ii) Berlage, (iii) a wavelet derived from a Butterworth filter, (iv) a Gabor wavelet, (v) a Gaussian wavelet, (vi) an Ormsby wavelet, (vii) a Rayleigh wavelet, and, (viii) a Ricker wavelet.

20. The method of claim 14 wherein said at least one property further comprises an additional rock property selected from (i) a shear wave velocity, and, (ii) a density.

21. The method of claim 14 wherein said plurality of realizations further comprises perturbations of said compressional velocity.

22. The method of claim 21 wherein said plurality of realizations further comprises perturbations of at least one additional property selected from (i) a shear velocity, and, (ii) a density, wherein said perturbations are relative to an expected trend value of said additional property.

23. The method of claim 1 wherein said parameter of interest is a probability that the measured plurality of seismic attributes is associated with said trial value of said at least one fluid property.

24. The method of claim 1 wherein said parameter of interest comprises a PDF of said trial value of said at least one fluid property.

25. The method of claim 1 wherein said at least one fluid property is selected from the group consisting of (i) a fluid modulus, (ii) a density, and, (iii) a fluid saturation.

26. The method of claim 1 wherein determining said second PDF further comprises using a critical porosity model.

27. The method of claim 1 wherein determining said second PDF further comprises using a form of the Gassman equation.

* * * * *